United States Patent [19]
Dugger

[11] Patent Number: 6,066,305
[45] Date of Patent: May 23, 2000

[54] PRODUCTION OF TRANSPARENT CATIONICALLY-HOMOGENEOUS NANOSTRUCTURED REFRACTORY OXIDES AT REDUCED TEMPERATURES

[76] Inventor: Cortland Otis Dugger, 12600 Westover Ct., Upper Marlboro, Md. 20772

[21] Appl. No.: 08/990,757

[22] Filed: Dec. 15, 1997

Related U.S. Application Data

[63] Continuation-in-part of application No. 08/294,813, Aug. 25, 1994, abandoned, which is a continuation-in-part of application No. PCT/US93/01846, Mar. 1, 1993, which is a continuation-in-part of application No. 07/843,218, Feb. 28, 1992, abandoned.

[51] Int. Cl.$^7$ ............................... C01F 17/00; C01F 7/00
[52] U.S. Cl. ..................... 423/263; 423/592; 423/593; 423/625
[58] Field of Search .................. 423/263, 472, 423/592, 625, 639, 643, 72, 593, 594, 595, 598, 599, 600, 604–606, 608, 617, 618, 622, 624, 632; 501/126, 127, 152, 153

[56] References Cited

U.S. PATENT DOCUMENTS

| | | | |
|---|---|---|---|
| 3,941,874 | 3/1976 | Payne | 423/489 |
| 4,402,924 | 9/1983 | McVicker et al. | 423/472 |
| 5,558,847 | 9/1996 | Kaaber et al. | 423/111 |

*Primary Examiner*—Steven Bos

[57] ABSTRACT

This invention relates to a generic process for producing a refractory oxide which comprises reacting liquid water with: at least one metal fluoride reactant; or at least one metal fluoride reactant and at least one metal oxide reactant; or at least one metal oxide reactant and an aqueous hydrogen fluoride solution, to produce either a colloidal mixture or a solution; drying either the colloidal mixture or solution; heating the dried product to produce a solid state metal hydroxyfluoride; heating the hydroxyfluoride to a temperature at which it chemically decomposes into a cationically-homogeneous and nanostructured solid state metal oxyfluoride; and performing one of the following heating steps: (i) to a solid state decomposition-temperature where the oxyfluoride chemically decomposes into a refractory oxide; or, (ii) to a molten state decomposition-temperature where the oxyfluoride chemically decomposes into a refractory oxide; or, (iii) to a vapor state decomposition-temperature where the oxyfluoride chemically decomposes into a refractory oxide.

7 Claims, No Drawings

PRODUCTION OF TRANSPARENT CATIONICALLY-HOMOGENEOUS NANOSTRUCTURED REFRACTORY OXIDES AT REDUCED TEMPERATURES

This is a continuation-in-part (CIP) of U.S. application Ser. No. 08/294,813, filed Aug. 25, 1994, now abandoned; which in turn is a CIP of PCT Application PCT/US93/01846, filed Mar. 1, 1993; which in turn is a CIP of U.S. application Ser. No. 07/843,218, filed Feb. 28, 1992, now abandoned. The applicant is claiming the benefits of all the above filing dates.

BACKGROUND OF THE INVENTION

This invention, referred to as either the Dugger Process (DP) or the Uniform Cation Distribution Process (UCDP), is a generic process for producing refractory metal hydroxyfluorides, metal oxyfluorides and refractory metal oxides. The reproducible oxides are produced as transparent or opaque, cationically-homogeneous, nanostructured and substantially pure compositions, at temperatures ranging from 100° C. to 1537° C. lower than the natural melting points of the oxides. For example, while magnesium oxide's melting point is 2852° C., UCDP produces transparent magnesium oxide at 1315° C.; a 1537° C. temperature difference. Hence, this newly characterized product illustrates one of numerous novel and generic featured products and/or product improvements produced by the UCDP's irreversible chemical reaction of an oxide reactant to its oxide product.

More particularly, this invention relates to a generic process for producing, from small to commercial size quantities, refractory oxides of all compositional categories which include solid solution, undoped, doped, congruent melting, incongruent melting, stoichiometric and nonstoichiometric compositions as three-dimensional single crystalline, polycrystalline, glass and various type composite entities. In this invention, a composition refers to a compound, unless it is specified as a glass composition.

In this invention, a chemical complex is defined as: (1) at least one metal oxide chemically reacted with an aqueous hydrogen fluoride solution [HF(aq)] or its derivatives; or (2) at least one metal (cationic) fluoride chemically bonded to at least one oxygen anion, or to at least one hydroxyl group, or to at least one oxygen anion and one hydroxyl group. The chemical complex can display an excess of electrical charges. Therefore, metal hydroxyfluorides and metal oxyfluorides are chemical complexes. A HF(aq) derivative is a powder or granular mixture or solution in which hydrogen and fluoride ions are ingredients, i.e., ammonium hydrogen fluoride ($NH_4HF_2$).

This invention, based on the Second Law of Thermodynamics, is operative because the below serial thermochemical shifting equilibria Reactions I–VA, by heat alone, proceed irreversibly to the right and render desired refractory oxide end products and volatile by-products. The Reactions' shifting chemical equilibria are indicative of precursors' formations or decompositions, as measured by the compositions' weight losses due to the volatile by-products reactions. Thus, the controlled serial thermochemical Reactions I–VA enable the complete conversion of a fully hydrated nanostructured metal fluoride and/or oxide to a metal hydroxyfluoride which decomposes into a metal oxyfluoride which decomposes into a refractory metal oxide end product. UCDP is the only process that produces all of the refractory oxide compositional categories.

The term "refractory oxide," is a metal oxide of ionic-covalent bonding. The efficacy of a refractory oxide's properties is principally a function of its starting materials and the process used to produce the oxide. These factors are controlled to obtain optimal reproducible end product properties.

Some of the major disadvantage-causal problems of the prior art refractory oxide production methods include: poor production reproducibility (reliability); random grain sizes; agglomerated powders which causes unintentional porosity and resulting low material densities; and, incomplete sintering reactions; volatilization of components as their melting points are approached with resulting uncontrollable cationic and anionic inhomogeneities (defects).

Conventional refractory oxide manufacturing, for example, requires high sintering temperatures for a given period of time to ensure an end product whose density closely approaches theoretical. For optimum results, this procedure is restricted to those solid state reactions whose reactants are thermally-stable throughout the reaction process, i.e., oxidative and/or vapor pressure state-wise. Also, harmful impurities can contaminate the prepared mixtures because of the powder-mixing procedures used. These restrictions and those earlier discussed in addition to a number of other constraints, limit present-day commercial manufacture to only a very few of the many compositional categories produced by the UCDP.

Prior art use of fluorides in thermohydrolytic procedures is different from the unique and novel UCDP. These differences are exemplified by the below prior art References 1–4 and 7–9.

1. Popov, A. I.; Knudson, G. E., "Preparation and Properties of the Rare Earth Fluorides and Oxyfluorides," *J. Am. Chem. Soc.*, 76, Feburary 1954, p. 3921.
2. Brixner, L. H., "Ferromagnetic Material Produced From Ferric Oxide And Barium Halide or Strontium Halide, And Process For Making Same," U.S. Pat. No. 3,113,109, Dec. 3, 1963.
3. Messier, D. R.; Pask, J. A., "Kinetics of High Temperature Hydrolysis of Magnesium Fluoride: II, Influence of Specimen Geometry and Type and of Product Layers", *J. Am. Cer. Soc.*, Vol 48, No. 8, September 1965, p. 459.
4. Utsunomiya, T.; Hoshino, Y.; Sato, M., "Process of Hydrolysis Reaction from $YF_3$ to $Y_2O_3$ in a Humid Air at High Temperatures," Bulletin of the Tokyo Institute of Technology, No. 108, 1972.
5. Bergna, H. E.; Iler, R. K., "Microcrystalline Corundum Powder, Sols Thereof, And Processes For Preparing Both," U.S. Pat. No. 3,370,017, February 20, 1968.
6. Sellers, D. J.; Rhodes, W. H.; Vasilos, T., "Method Of Preparing Transparent Alumina," U.S. Pat. No. 3,899,560, Aug. 12, 1975.
7. Dugger. C. O., "The Growth of Pink Magnesium Aluminate ($MgAl_2O_4$) Single Crystals," *J. of Electrochem. Soc.*, Vol 113, No. 3, March 1966, p. 306.
8. Dugger, C. O., "Solution Growth of Oxidic Spinel and Other Oxide Single Crystals Following The Hydrolysis of Some Fluorides," *J. of Phys. & Chem. of Solids Supplement*, 1st Ed., Pergamon Press, New York, 1967, p. 493.
9. Dugger, C. O., "Method For Growing Oxide Single Crystals," U.S. Pat. No. 3,595,803, July 27, 1971.

Popov, Brixner, Messier and Utsunomiya, the first four references, all employed the same process of using a carrier gas to transport reactant water vapor to a second reactant which was either a metal (cationic) halide or metal oxyhalide to produce a metal oxide at temperatures ranging from 800° C. to 1350° C. As a function of the high temperature environment, chemical reactions between the metal halide/oxyhalide and water vapor reactants, caused the conversion of the halide/oxyhalide to the corresponding metal oxide and a gaseous hydrogen halide by-product. This type of chemical reaction process is referred to as a gaseous pyrohydrolytic reaction process; where "pyro" refers to heat and "hydrolytic" refers to the reaction of a substance with water or its ions.

On a commercial scale-basis to attain the efficacy of the UCDP water vapor could not duplicate most of the novel and numerous roles of liquid water neither chemically nor cost-effectively in the production of a refractory oxide. Because, for example, the quantitative water vapor effectiveness and the loss of water vapor of the gaseous pyrohydrolysis reaction process would be unreliable; an unknown amount of water vapor would be lost by evaporation before and during the reactant gaseous reactions. Thus, nonuniform water vapor phase hydrolysis of massive reactant quantities by the gaseous pyrohydrolysis would occur.

Bergna's (Ref. 5) prior art mechanical refractory oxide materials preparation procedures cause major materials and cost-effective disadvantages, as earlier discussed. The UCDP markedly reduces or eliminates these disadvantages.

Sellers' (Ref. 6) patent is a particularly specific and an extremely expensive procedure for producing one transparent $Al_2O_3$ sample per run by the simultaneous application of heat (>1800° C.) and pressures ($\geq$3000 p.s.i.) without lateral constraints called "hot-forging." The UCDP eliminates this expensive procedure to manufacture transparent alumina.

Dugger (Ref. 7–9) used excess metal fluorides which served as both reactants and solvents to which he added given amounts of naturally occurring hydrated oxides as solutes to form molten solutions; which when slowly cooled, produced binary metal oxide single crystals. The purity and quality of the crystals ranged from good to poor because of solvent inclusions. The process was of low reliability, primarily because of insufficient hydration of the reactant metal fluorides with resultant low acceptable crystal yields; which were seldom reproducible.

In this invention, UCDP is a serial thermohydrolytic-reaction process where "thermo" indicates heat of reaction and/or furnace heating and "hydrolysis" is defined as a chemical reaction of a substance with liquid water or its ions ($OH^-$, $O^-$ and $H^+$) in the solid, liquid (molten) or vapor states.

The UCDP, a novel thermochemical commercial production procedure, is a marked improvement over the existing commercial refractory oxide production procedures and the refractory oxide research syntheses of the above references, because the UCDP markedly reduces or completely eliminates the restrictions or disadvantages of these exemplified procedures.

The chemistry of hydrogen fluoride (HF) is significantly different from the chemistry of hydrogen chloride (HCl), hydrogen bromide (HBr) or hydrogen iodide (HI); chemistry of the latter three acids are rather similar. Of the latter three, HCl is the most thermally stable. For example: (a) at 1000° C., HF demonstrates much greater stability (<<<% decomposition to $H_2$ and $F_2$) than the other acids; (b) HF's <10% ionization (weak acid) vs. the other acid's >93% ionization (strong acids); (c) HF's strong H—F bonding (d) strong HF bonding (polymerization) with water; (e) HF's 525% higher boiling point (20° C.) over HCl's boiling point (-85° C.); (f) HF reacts with most metals and metalloids.

On average, the melting and boiling points of fluorides and chlorides of the same cation are significantly different. For example, calcium fluoride's ($CaF_2$) melting and boiling points are 1423° C. and 2500° C. and calcium chloride's ($CaCl_2$) melting and boiling points are 782° C. and >1600° C. Calcium oxide (CaO) melts at 2614° C. The melting and boiling point temperature differences, respectively, between CaO and $CaF_2$ are 1191° C. and 350° C. and between CaO and $CaCl_2$ are 1832° C. and 1250° C. From the foregoing and laboratory experiments, the thermochemical properties of metal (cationic) fluorides are, by far, more stable and effective than metal chlorides in producing quality macroscopic three-dimensional (3-D) refractory oxides single crystals.

This applicant is unaware of any prior art that teaches or renders obvious, the use of metal fluorides as described in this invention. Of the four oxyhalides, only oxyfluorides thermochemically decompose into refractory oxides which exhibit the Novel (Inventive) Process Features of this invention.

While the UCDP is a process for producing a considerable number of high purity, high structural quality, reproducible yields of all of the refractory oxide compositional categories, there is some scientific uncertainty as to the actual precursor (intermediate) reactions that occur in thermochemically converting a hydrated metal fluoride to the corresponding refractory oxide end product; precursor metal hydroxyfluoride and metal oxyfluorides complexes are the intermediates reported in the literature. In this invention, therefore, it is assumed that all hydrated metal fluorides are thermochemically converted into precursor metal hydroxyfluoride and metal oxyfluoride complexes only, and the hydroxyfluoride and oxyfluoride complexes are considered to be low temperature (ca. <900° C.) and high temperature complexes, respectively. Other reactants used with hydrated metal fluorides include oxides, hydroxides, carbonates, nitrates, silicates, phosphates, selenates and sulfates. The stoichiometric amount of liquid water is determined and can be used but an excess amount is generally used to ensure the complete hydration of all reactants.

The UCDP differs from all other prior art refractory oxide manufacturing processes because it: (1) is a novel commercial thermochemical process for manufacturing refractory oxide of all compositional categories; (2) manufactures at novel reduced-temperatures, high structural quality, purity, and reproducible yields; (3) is the only commercial process which simultaneously manufactures and highly purifies compositions from the three states of matter [solid, liquid (molten) and vapor phase]; (4) markedly improves upon prior art refractory oxide manufacturing processes by: (a) replacing prior art average microstructured ($10^{-6}$ meters) grain-sized compositions with nanostructured ($10^{-9}$ meters) grain-sized compositions which significantly improve not only the numerous novel process and compositional inextricable-property-features but also refractory oxide applications; and (b) the portent of fabricating transparent, nanostructured geometrically-complex near net-shaped refractory oxide objects for high temperature applications with on-line, optical nondestructive evaluation (NDE) inspections.

The term "cationically-homogeneous" means that the refractory oxide's cations are uniformly distributed, i.e., with a compositional consistency of $\geq$99%, e.g., 99.5% or greater, preferably 99.9% or greater.

The term "nanostructured" material refers to the very small nanometer-size order of magnitude building structure of a material that includes grains, particles, filaments or layers of sizes less than 100 nanometers across.

The term "decomposition-temperature" refers to either a given temperature or a small temperature range within a larger temperature range wherein a precursor complex chemically decomposes by heat alone. The larger temperature range permits an oxyfluoride to include solid, molten and vapor oxyfluoride states; which from each state, a refractory oxide end product can be produced.

The term "substantially pure" refractory oxide as used herein means, based upon chemical analyses, the actual cationic composition differs by no more than about 3 wt. % from theoretical, preferably less than 1 wt. %, and most preferably, e.g., in the case of laser or superconductor oxides, 0.5 wt. % or less and the composition is substantially free of water, hydroxyl groups and deleterious impurities. UCDP compositions, which are insoluble in specific acids, salts or bases and contain deleterious impurities soluble in those acids, salts or bases, are powdered and the impurities removed by dissolution. The compositions are then again UCDP processed; beginning with Reaction IIA.

OBJECTS OF THE INVENTION

A primary object of this invention is to provide a novel, generic, highly reliable, reproducible and high yielding process which can produce, on a commercial scale, substantially pure, cationically-homogeneous and nanostructured refractory oxides of a wide variety of compositional categories in various physical forms.

Another object of this invention is to produce cationically-homogeneous, nanostructured and substantially pure refractory oxides of a wide variety of compositional categories in various two or three-dimensionally shaped physical forms.

Another object is the manufacture of refractory oxides at temperatures ranging from 100° C. to 1537° C. below their natural melting points.

Still another object of this invention is to provide novel (inventive) features of a process which produces, in commercial amounts, a refractory oxide of unexpected, unique, inextricable and superior property-features which are striking improvements over the prior art and which markedly reduces or eliminates prior art refractory oxide process-production disadvantages.

A further object is the manufacture of novel refractory oxide compositions.

Still further objects of advantages and features of this invention will become apparent upon consideration of the following detailed description thereof.

SUMMARY OF THE INVENTION

In a process aspect, this invention relates to a serial thermochemical process which comprises producing and isolating the cationically-homogeneous nanostructured precursor metal hydroxyfluoride complex and its serial thermal decomposition product, a precursor metal oxyfluoride complex; which when heated to its decomposition-temperature, chemically decomposes, by heat alone, into a cationically-homogeneous, nanostructured and substantially pure refractory oxide and volatile by-products.

In a preferred process aspect, a process for producing a refractory oxide which comprises (a) reacting liquid water with: (1) at least one metal fluoride reactant, or (2) at least one metal fluoride reactant and at least one metal oxide reactant, or (3) at least one metal oxide reactant and an aqueous hydrogen fluoride solution, to produce either a slurry-blended dispersion which produces a fully-hydrated, cationically-homogeneous and nanostructured colloidal mixture or a solution; (b) removing the liquid from either the colloidal mixture or solution to form a dried product; (c) heating the dried product to produce a solid state metal hydroxyfluoride; (d) further heating the thus-produced metal hydroxyfluoride to a higher temperature at which it chemically decomposes, by heat alone, into a cationically-homogeneous nanostructured solid state metal oxyfluoride; and performing one of the following heating steps: (i) heating the thus-produced metal oxyfluoride to a solid state decomposition-temperature at which it chemically decomposes, by heat alone, into a cationically-homogeneous nanostructured solid state refractory oxide; or, (ii) heating the thus-produced metal oxyfluoride to a molten state decomposition-temperature at which it chemically decomposes, by heat alone, into a cationically-homogeneous nanostructured solid state refractory oxide; or, (iii) heating the thus-produced metal oxyfluoride to a vapor state decomposition-temperature at which it chemically decomposes, by heat alone, into a cationically-homogeneous nanostructured solid state refractory oxide.

Process options in the preferred process aspect of step (a) is the replacement of "reacting liquid water" by using: (1) an aqueous hydrogen fluoride solution or 2) an ammonium hydrogen fluoride solution. Another option is that either one or both of the produced precursor solid state metal hydroxyfluoride or metal oxyfluoride complexes can be isolated. Process aspect options (1) and (2) read:

(1) A process for producing a refractory oxide which comprises (a) reacting an aqueous hydrogen fluoride solution with: (1) at least one metal fluoride, or (2) at least one metal fluoride and at least one metal oxide, or (3) at least one metal oxide, to form either a slurry-blended dispersion which produces a fully-hydrated, cationically-homogeneous, nanostructured colloidal mixture, or a solution; (b) removing the liquid from either the colloidal mixture or solution and forming a dried product; (c) heating the dried product to produce a solid state metal hydroxyfluoride and volatile by-products; (d) further heating the thus-produced metal hydroxyfluoride to a higher temperature at which it chemically decomposes, by heat alone, into a cationically-homogeneous nanostructured refractory solid state metal oxyfluoride and volatile by-products; and performing one of the following heating steps: (i) heating the thus-produced metal oxyfluoride to a solid state decomposition-temperature at which it chemically decomposes, by heat alone, into a cationically-homogeneous nanostructured solid state refractory oxide; or, (ii) heating the thus-produced metal oxyfluoride to a molten state decomposition-temperature at which it chemically decomposes, by heat alone, into a cationically-homogeneous nanostructured solid state refractory oxide; or, (iii) heating the thus-produced metal oxyfluoride to a vapor state decomposition-temperature at which it chemically decomposes, by heat alone, into a cationically-homogeneous nanostructured solid state refractory oxide.

(2) A process for producing a refractory oxide which comprises (a) reacting an ammonium hydrogen fluoride solution with: (1) at least one metal fluoride, or (2) at least one metal fluoride and at least one metal oxide, or (3) at least one metal oxide, to form either a slurry-blended dispersion which produces a fully-hydrated, cationically-homogeneous, nanostructured colloidal mixture, or a solution; (b) removing the liquid from either the colloidal mixture or solution and forming a dried product; (c) heating the dried product to produce a solid state metal hydroxyfluoride and volatile by-products; (d) further heating the thus-produced metal hydroxyfluoride to a higher temperature at which it chemically decomposes, by heat alone, into a cationically-homogeneous nanostructured refractory solid state metal oxyfluoride and volatile by-products; and performing one of the following heating steps: (i) heating the thus-produced metal oxyfluoride to a solid state decomposition-temperature at which it chemically decomposes, by heat alone, into a cationically-homogeneous nanostructured solid state refractory oxide; or, (ii) heating the thus-produced metal oxyfluoride to a molten state decomposition-temperature at which it chemically decomposes, by heat alone, into a cationically-homogeneous nanostructured solid state refractory oxide; or, (iii) heating the thus-produced metal oxyfluoride to a vapor state decomposition-temperature at which it chemically decomposes, by heat alone, into a cationically-homogeneous nanostructured solid state refractory oxide.

In another process aspect, this invention relates to a General Manufacturing Procedure for producing a cationically-homogeneous, nanostructured and substantially pure refractory oxide produced within a lower temperature range (from 200° C. to 700° C.) than customarily used to produce oxidic ceramics.

In another process aspect, this invention relates to a process for the commercial production of a cationically-homogeneous, nanostructured and substantially pure refractory oxide in a novel two or three-dimensionally shaped, crystalline form, produced within a lower temperature range (from 100° C. to 1537° C.) than its natural melting point.

In another process aspect, this invention relates to a process for the commercial production of a cationically-homogeneous, nanostructured and substantially pure refractory oxide produced from a molten oxyfluoride complex.

In another process aspect, this invention relates to a process for the commercial production of a cationically-homogeneous, nanostructured and substantially pure refractory oxide produced from a vapor phase oxyfluoride complex.

In a compositional aspect, this invention relates to cationically-homogeneous, nanostructured and substantially pure refractory oxides in a novel substantially two or three-dimensional form, many of which are transparent and exhibit one or both of electrostatic and magnetic properties.

In another compositional aspect, this invention relates to chemically novel refractory oxides.

In yet another compositional aspect, this invention relates to the precursor metal hydroxyfluoride and metal oxyfluoride complexes and to the refractory oxides of this invention.

DETAILED DESCRIPTION OF THE INVENTION

The generic UCDP is a commercial serial thermochemical manufacturing process by which most refractory oxides can be produced over a temperature range from 20° C. (room temperature hydration) to 2000° C. Within this temperature range, virtually any pressure which does not adversely affect shifting chemical equilibria reactions can be used.

The process is possible because the type of chemical bonding of refractory oxides is ionic-covalent bonding. Most metals chemically react with fluorine to produce metal fluorides. Because metal fluorides are of high percent ionicities and high hydration energies, they become fully hydrated and form complex-ion formations when they react with liquid water. In this invention, the Chemical Periodic Table metals which can be used to produce metal fluorides and oxides are: (a) IA–VA, including the metalloids; (b) IB–VIIB; (c) Group VIII; (d) the lanthanides; and, (e) uranium and thorium.

The number of different cations (metals) and their concentrations in refractory oxides can vary widely, as illustrated in the examples below. Because of the unexpected combined superior product properties produced, these products can be used in all refractory oxide productions, fabrication procedures and applications such as sensors, filters, photonics, wave-guides, electro-optics, high density and composite near-net-shaped structures, superconductors, insulators, catalysts, films, fibers, nuclear waste management, etc.

All metal hydroxyfluorides, metal oxyfluorides and refractory oxides of this invention are produced by the below representative Reactions I–VA, which are exemplified by the production of yttrium products. To produce yttrium oxide $[Y_2O_3(c)]$ from its corresponding hydrated yttrium fluoride, the overall reaction equation is:

$$2YF_3(p) + 3H_2O(l) \rightarrow Y_2O_3(c) + 6HF(g)$$

The weight percent loss of gaseous hydrogen fluoride [HF (g)] is 34.7%.

Reaction I: $YF_3$ hydration (ca. 20° C. to ca. 95° C.)

$$2YF_3(p) + 3H_2O(l) \rightarrow 2[YF_3 \cdot 1.5H_2O](c) + \text{heat}.$$

Reaction II: Thermochemical reaction and shifting chemical equilibria produce a solid state yttrium hydroxyfluoride complex from ca. 150° C. to ca. 900° C.

$$2[YF_3 \cdot 1.5H_2O](c) \rightarrow Y_2(OH)_3F_3(c) + 3HF(g)$$

Reaction IIA: Yttrium oxide-aqueous hydrogen fluoride solution reaction render simultaneous UCDP yttrium oxide processing and purification via recrystallization.

$$Y_2O_3(p) + 3HF(aq) \rightarrow Y_2(OH)_3F_3(c)$$

Reaction III: Increasing temperature (>600° C.), thermochemical decomposition and shifting chemical equilibria of yttrium hydroxyfluoride complex produce a solid state oxyfluoride complex at ca. 1110° C.

$$Y_2(OH)_3F_3(c) \rightarrow [Y_2O_3F_3]^{3-}(c) + 3H^+(g)$$

Reaction IV: Chemical decomposition of yttrium oxyfluoride complex and shifting equilibria produce transparent yttrium oxide at ca. 1275° C. over 15 hrs.

$$[Y_2O_3F_3]^{3-}(c) \rightarrow Y_2O_3(c) + 3F^-(g)$$

Reaction V: Solid state yttrium oxyfluoride complex becomes molten at ca. 1430° C.

$$[Y_2O_3F_3]^{3-}(c) \rightarrow [Y_2O_3F_3]^{3-}(m)$$

Reaction VA: Molten or vapor phase isothermal $[Y_2O_3F_3]^{3-}(m,v)$ decomposition-temperature & shifting equilibria at ca. 1430° C.–1480° C., preferably at 1470° C., with programmed cooling to 1290° C. over eight hours, produce transparent $Y_2O_3$ crystals.

$$[Y_2O_3F_3]^{3-}(m,v) \rightarrow Y_2O_3(c) + 3F^-(g)$$

In the equations, the symbols are: p=powder, l=liquid, g=gas, c=crystalline, m=molten, v=vapor and →=reaction direction and heat. The furnace-exiting volatile by-products are either bubbled through neutralizing solutions or condensed and stored.

Reactions I–VA are further illustrated by the below General Manufacturing Procedure which produces an assortment of compositions of combined superior properties.

1. Write the appropriate chemical equations and calculate their reaction products' theoretical weight percent (wt. %) losses;
2. Calculate and weigh a 100 gram batch of reagent grade or ultrapure reactants.
3. Homogeneously dry-mix the reactants, then produce either a colloidal mixture by performing an acidic, neutral or basic pH liquid water slurry-blended dispersion, which produces either a fully-hydrated, cationically-homogeneous, nanostructured colloidal mixture, or a solution.
4. Remove the liquid water from either the colloidal mixture or solution and form a dry product; pulverize and sieve (−200 mesh screen) the dried product (Reaction I); weigh from 3 to 7 grams to be processed for each run.
5. Place the powdered composition in a pre-weighed empty crucible, weigh and program heat the crucible to a temperature and hold for several hours to react the mixture to a solid state hydroxyfluoride complex (Reaction II).
6. Either during the heat treatment or at room temperature, weigh the crucible to determine the composition's wt. % loss. Pulverize and sieve the composition through a 325 mesh screen. X-ray analyze to determine the status of the precursor hydroxyfluoride complex.
7. When the hydroxyfluoride complex phase reaction is complete, place the powdered composition in a pre-weighed empty crucible, weigh and heat the crucible to a Reaction III hydroxyfluoride decomposition-temperature for several hours.
8. Either during the heat treatment or at room temperature, weigh the crucible to determine wt. % loss, pulverize, −325 sieve and X-ray to evaluate the status of the solid state oxyfluoride complex phase.
9. When the oxyfluoride complex phase is complete, compact and heat from a Reaction IV through a VA oxyfluoride decomposition-temperature and hold several hours for solid, molten or vapor state production. Either during the heat treatment or at room temperature, weigh the crucible to determine wt. % loss, pulverize, sieve through a 325 sieve and X-ray to evaluate the reaction status of the solid state refractory oxide.
10. Perform chemical, physical and infrared absorption analyses of the refractory oxide end product to determine if the reaction is complete, nanostructured and substantially pure.
11. If residual oxyfluoride is present, heat treat the refractory oxide to a purification-temperature above the maximum oxyfluoride decomposition-temperature but below the refractory oxide's melting point, in either an air or an oxygen environment; hold for about eight hours.
12. When the refractory oxide is substantially pure, an annealing at a given temperature may be required to impart a specific property, i.e., semiconductivity by means of a reducing gas.

To UCDP produce a refractory oxide, the overall chemical equation is first written which gives the cationic formula of the desired refractory oxide end product. The formula's cations and their ratios (concentrations) are the reactants (starting materials) which are calculated and weighed as fluorides and/or oxides. The precursors' and refractory oxide's cations and their ratios, on a cationic mole basis, are identical. Their cationic identity and homogeneity account for their close structural similarity and ionic orientation, as well as the UCDP's highly reliable and reproducible production; since only minimal cationic diffusion and small anionic shifts appear to occur during the transitions of precursors to a refractory oxide end product.

The quantity of the reactant mixtures used in the examples ranged from three grams to seven grams. In general, the starting hydrated composition's temperature is raised from ambient temperature to about 95° C. (Reaction I), which is held for about one hour to ensure the complete hydration of the reactant colloidal mixture. The mixture's temperature is then raised to about 150° C. and held for about three hours to produce a dried product. The dried product's temperature is raised to about 900° C., the approximate maximum hydroxyfluoride complex reaction temperature, and held for about three hours. The hydroxyfluoride's temperature is raised to a decomposition-temperature wherein the hydroxyfluoride, in three hours, decomposes with shifting chemical equilibria into a homogeneous solid state oxyfluoride and volatile by-products. The temperature is then raised to the oxyfluoride's metastable complex decomposition-temperature where, in about five hours, the complex chemically decomposes, with shifting chemical equilibria, to the refractory oxide end product and volatile by-products; or, the temperature is raised to an oxyfluoride molten decomposition-temperature where over an approximate three to six hours, the molten oxyfluoride decomposes, with shifting chemical equilibria, into the corresponding refractory oxide and volatile by-products; or, the oxyfluoride molten temperature is raised to a vaporization decomposition-temperature, where over an approximate two to three hours, the oxyfluoride is vaporized onto a substrate and decomposes to the corresponding refractory oxide and volatile by-products.

Ordinarily the decomposition-temperatures are maintained substantially constant, e.g., within about 2° C. and preferably within about 1° C., during the UCDP. Constant (isothermal) temperatures produce strain-free compositions and monosized crystallites. The specific decomposition-temperature used depend upon the specific oxyfluoride being thermochemically decomposed but the range is from about 100° C. to about 1537° C. below the refractory oxide's reported melting point.

In a preferred aspect, the novel multi-cationic and known refractory oxides of this invention are produced from precursor metal oxyfluorides as illustrated below. It is assumed that the oxyfluoride formula compositions in a given series are similar, both chemically and structurally and are manufactured within an analogous temperature range in air at atmospheric pressure. Lanthanides are the chemical elements of atomic numbers from 57 to 71 of the Chemical Periodic Table.

OXYFLUORIDE FORMULA COMPOSITIONS $Al_{2-(x+y+w)}R_xJ_yQ_{0.75w}O_{3-0.5f}F_f$
J = Cr, Ga, Ti, Fe, V, Co, Mn;
Q = Si, Ge, Sn; R = Lanthanides;
$f \leq 5.7; 0 \leq x \leq 1; 0 \leq y \leq 0.5; 0 \leq w \leq 1.8;$
$Ba_{2-p}Na_{1-x}K_xR_{0.67p}Nb_{5-y}Ta_yO_{15-0.5f}F_f$
R = Lanthanides
$f \leq 29.7; 0 \leq p \leq 0.6; 0 \leq x \leq 1.0; 0 \leq y \leq 5.0;$
$Ba_{1-(2p+s+0.5x)}U_pR_pD_sU_xMg_{1-y}D_y$
$Al_{10-(z+w)}J_zQ_{0.75w}O_{17-0.5f}F_f$ -continued

OXYFLUORIDE FORMULA COMPOSITIONS $D_s$ = Ca, Sr, Pb; Q = Si, Ge;
J = Cr, Ga, Ti, Mn, V, Fe, Co; U = Na, K;
$D_y$ = Co, Cu, Ge, Ni, Zn; R = Y, lanthanides;
$f \leq 33.7$; $0 \leq p \leq 0.6$; $0 \leq s \leq 1.0$; $0 \leq w \leq 7.5$;
$0 \leq x \leq 1.2$; $0 \leq y \leq 1$; $0 \leq z \leq 0.6$;
$Ba_{1-x}D_xTi_{1-(y+0.75z)}J_zZr_yO_{3-0.5f}F_f$
D = Sr, Pb, Ca, Sn; J = Fe, Cr;
$f \leq 5.7$; $0 \leq x \leq 1$; $0 \leq y \leq 1$; $0 \leq z \leq 0.5$;
$KTa_{1-(x+0.6y)}Nb_xJ_yO_{3-0.5f}F_f$
J = Cr, Fe; $f \leq 5.7$; $0 \leq x \leq 1$; $0 \leq y \leq 0.5$;
$LiSr_{1-(0.5g+x+z)}Al_{1-(y+w)}U_gD_zR_{0.67x}J_yQ_{0.75w}O_{3-0.5f}F_f$
U = Na, K; D = Mg, Ca, Ba;
R = Lanthanides; J = Cr, Fe, Ti, V, Mn;
Q = Ge, Si, Sn, Ti, Zr;
$f \leq 5.9$; $0 \leq g \leq 2$; $0 \leq w \leq 1.3$; $0 \leq x \leq 0.7$; $0 \leq y \leq 0.2$; $0 \leq z \leq 1$
$Li_{1-(x+z+d)}D_{0.5x}D_{0.5d}J_{0.33z}Ta_{1-y}Nb_yO_{3-0.5f}F_f$
$D_x$ = Ni, Co, Fe, Mg; $D_d$ = Ni, Co, Cu, Zn;
J = Cr, Fe;
$0 \leq d \leq 0.5$; $f \leq 5.7$; $0 \leq x \leq 1$; $0 \leq y \leq 1$; $0 \leq z \leq 0.4$;
$Mg_{1-z}D_zAl_{2-(x+y)}R_xJ_yO_{4-0.5f}F_f$
D = Co, Ni, Cu, Zn, Ge; R = Lanthanides
J = Co, Cr, Fe, Mn, Ti, V;
$f \leq 7.7$; $0 \leq x \leq 1$; $0 \leq y \leq 2$; $0 \leq z \leq 1$;
$Mg_{1-(x+y+z)}D_zJ_{0.67y}R_{0.67x}O_{1-0.5f}F_f$
D = Ni, Co, Fe, Cu, Ge, Zn;
J = Cr, Fe, Ti; R = Lanthanides
$f \leq 1.7$; $0 \leq x \leq 0.83$; $0 \leq y \leq 1$; $0 \leq z \leq 1$;
$Pb_{2-z}D_zK_{1-x}Na_xNb_{5-y}Ta_yO_{15-0.5f}F_f$
$D_z$ = Ba, Ca; $f \leq 29.7$;
$0 \leq x \leq 1$; $0 \leq y \leq 5$; $0 \leq z \leq 2$;
$Sr_{1-(x+2p+z)}D_xU_pR_pJ_{0.67z}Nb_{2-y}Ta_yO_{6-0.5f}F_f$
U = Na, K; D = Ba, Ca, Pb, Sn;
J = Cr, Fe; R = Y, Lanthanides;
$f \leq 11.7$; $0 \leq p \leq 0.18$; $0 \leq x \leq 1$; $0 \leq y \leq 2$; $0 \leq z \leq 0.18$;
$W_{1-(0.33z+0.5x+0.5y+0.67w+0.83d)}D_zR_xJ_yQ_wA_dO_{3-0.5f}F_f$
D = Co, Cu, Fe, Mg, Ni, Zn;
R = Lanthanides; A = Nb, Ta, V;
J = Al, Co, Cr, Fe, Mn, Ti, V;
Q = Ge, Mn, Sn, Ti, V, Si, Zr;
$f \leq 5.9$; $0 \leq d \leq 1.1$; $0 \leq w \leq 1.2$; $0 \leq x \leq 0.1$;
$0 \leq y \leq 1.8$; $0 \leq z \leq 2.6$;
$Y_{2-(x+d)}R_xJ_dO_{3-0.5f}F_f$
R = Lanthanides;
J = Cr, Ga, Ti, Fe, Al, V, Co, Ni, Mn;
$0 \leq d \leq 2$; $f \leq 5.7$; $0 \leq x \leq 2$;
$Y_{3-x}R_xAl_{5-(y+w)}J_yQ_{0.75w}O_{12-0.5f}F_f$
J = Cr, Ga, Ti, Fe, V, Co, Mn, Ni, Sc;
Q = Si, Ge, Zr; R = Lanthanides;
$f \leq 23.7$; $0 \leq w \leq 5$; $0 \leq x \leq 3$; $0 \leq y \leq 1.5$;
$Y_{3-x}R_xFe_{5-y}J_yO_{12-0.5f}F_f$
R = Lanthanides;
J = Cr, Al, Ga, Co, Mn, Sc, Ni, Ti, V;
$f \leq 23.7$; $0 \leq x \leq 3$; $0 \leq y \leq 5$;
$Zr_{1-(0.5z+0.75x+0.8y+w+1.3d+1.5c)}D_zR_xJ_yQ_wA_dX_cO_{2-0.5f}F_f$
D = Co, Fe, Ni, Mg, Mn, Zn; R = Lanthanides;
J = Al, Cr, Fe, Sc, Ti, Be, Mn, V;
Q = Ti, W, Si, Sn, Ce, V, Ge;
A = Ta, Nb; X = W;
$f \leq 3.9$; $0 \leq x \leq 0.27$; $0 \leq y \leq 0.21$; $0 \leq z \leq 0.61$;
$0 \leq w \leq 0.9$; $0 \leq d \leq 0.7$; $0 \leq c \leq 0.6$;

wherein "U", "D", "R", "J", "Q", "A" and "X" are one or more: univalent, divalent, rare-earth, trivalent, tetravalent, pentavalent and hexavalent cations, respectively. Rare-earth ("R") cations, also known as lanthanides, can be either divalent or trivalent.

Reactant liquid water performs the multi-functional role of: hydrolytic (hydration) agent; solvent; colloidal dispersing medium; a polymeric complexing agent with metal fluorides and/or oxide reactants; heat transfer agent; a catalyst which increases the frequency of colloidal particle collisions which enhances cationic homogeneity; and, natural convection dispersing medium in the manufacture of large objects such as near-net-shaped structures or single crystals. The optimum pH range research for the oxyfluoride formula compositions is on-going; however, a pH range from 3 to 6.5 of HF(aq) acidified reacting liquid water now is being used.

Process time for the overall complexes to decompose thermochemically into a refractory oxide end product is principally a function of the complexes' composition chemistry, the quantity of the complexes, the magnitude of the decomposition-temperatures and reaction periods employed. Weight loss measurements are made to determine the status of the processing conditions. In addition, thermoanalytical techniques can be used to assist in quantifying the kinetics and other thermochemical parameters.

If a new refractory oxide consists of more than one phase, the phases possibly can be UCDP produced individually, following the X-ray and chemical analyses of each phase, and if available, a review of the literature and their phase diagrams. Thus, this invention is a process that manufactures refractory oxide compositions which are: (a) commercially available; (b) known but heretofore commercially unavailable; and, (c) potentially useful as numerous novel compositions, such as disclosed herein.

The production of transparent compounds at temperatures significantly below their natural melting points is also a novel unexpected superior property of UCDP refractory oxide products. Transparency indicates that the composition is of high density with no or minimal granular porosity.

The melting point of yttrium oxide ($Y_2O_3$) is 2440° C. If melted and cooled at a slow rate, the solid may be transparent and likely strained. Large quantities of transparent, high quality 3-D macroscopic size $Y_2O_3$ are not commercially available, principally because of yttrium oxide's very high melting point and a lack of inert crucibles to contain its melt. Because of transparent $Y_2O_3$'s properties, it should serve numerous applications; two of which are infrared transmission and solid state laser applications.

UCDP production of 3-D, transparent yttrium oxide ($Y_2O_3$) is exemplified by Reactions I–VA. The transparency of these crystals are of optical grade. As a function of temperature and reaction-time, the monosizes of several batches measure from 1.5 mm to 4.0 mm. Under crossed polaroids, no strain is observed. It is envisioned that very large, overall high quality $Y_2O_3$ single crystals will be produced routinely and economically when expanded manufacturing facilities are used.

The melting point of aluminum oxide ($Al_2O_3$) is 2072° C. If melted naturally and cooled at a slow rate, $Al_2O_3$ may be transparent and likely strained. Like $Y_2O_3$, there are numerous applications for high structural quality, strain-free, transparent $Al_2O_3$. It has been UCDP produced at 1470° C. and held for twelve hours at this temperature; where the starting reactants were $Al_2O_3$ and $AlF_3 \cdot 3H_2O$ in a 1 to 3 mol ratio, respectively. The $Al_2O_3$ is of very high crystallinity, unagglomerated, of average 88 nanometers particle size and of 3.96 gms./cm³ density. Thus, reduced temperature UCDP production is a novel, process feature which can make high structural quality, strain-free transparent $Y_2O_3$ and $Al_2O_3$ commercially available in large quantities.

Additionally, neodymium and chromium doubly-doped yttrium aluminum garnet (YAG:Nd:Cr) is one of a number of compounds that have been UCDP produced as 3-D, transparent, facetted single crystallites. The optical-grade transparent laser element, dodecahedrally-facetted $Y_{2.71}Nd_{0.29}Al_{4.994}Cr_{0.006}O_{12}$ single crystallites (mp. ca. 1970° C.) were manufactured from solid and molten states within the temperature range of 1420° C. to 1480° C. The monosize of several batches varies from about 0.13 mm cubes to about 8 mm cubes, as a function of temperature and time. Under crossed polaroids, no strain is observed in these transparent compounds.

The reduced temperature feature, and all of the novel features of this process, is largely due to the reactants' nanostructured particle sizes, their homogeneities and the complex formations of fluoride and water's ions which render a mineralizing effect in lowering the solid, molten and vapor reaction temperatures. Thus, reduced temperature commercial UCDP production of all refractory oxides compositional categories is a major advancement in materials science.

It appears that there is no limit to the number of different cations that can be uniformly distributed in a given composition. Solid state produced refractory oxides demonstrate a uniform cation distribution greater than 99.8%. There is no problem caused by the different hydrolytic-reaction rates of the combined reactants' complexes, because of the high decomposition-temperatures and prolonged reaction periods used in Reactions IV–VA.

The no cation limit is generic and novel because a mixture of multi-cationic, multi-phased compositions could provide individually or collectively, multi-purpose applications, i.e., various sensor, photonics, solid state electrolyte, nonlinear dielectric, magnetic utility, etc. The various types of nanocomposites [$\leq 10^{-7}$ meters ($\leq 100$ nm) particle size diameters] can produce tailored-engineering combinations of numerous specific application properties heretofore neither available nor known. A nanocomposite is a mixture of two or more phases of different structures or compositions; where at least one phase is nanostructured. The UCDP can produce nanocomposite compositions as well as nanostructured single crystalline, single-phased compositions.

Various dilutions of either aqueous hydrogen fluoride [HF(aq)] solutions or basic hydroxide solutions are used to pH adjust the acidicity or basicity, respectively, of liquid water; the principal hydration and colloidal dispersion media of this invention. When HF(aq), or its derivative, replaces the reacting liquid water, of step (a) of the preferred process aspect under the Summary of the Invention, to enhance some reaction product, the HF(aq) solutions, or its derivative, can be diluted optionally with bases, other acids, or salts; depending on the chemical system being produced.

Beginning with Reaction IIA, an alternate reaction to Reactions I & II, enables a refractory oxide to be UCDP processed. While a Reaction IIA product can be processed using the preferred process aspect, it is generally processed by performing process option (1) or (2) given under the Summary of the Invention. Crystallites' habits produced by the process options appear to be better defined than those produced by the preferred process aspect. The apparent habit modifications may be due to the reacting fluoride-hydration-dispersion liquids' improved complex configurations, pH, less impurities, etc.

Transparent magnesium oxide (MgO) crystallites were produced by process option (2). Thirty-five grams of magnesium oxide (Mgo) was dry blended to enhance the production of its nanostructured particle size. Three hundred and fifty milliliters (350 ml.) of a ammonium hydrogen fluoride ($NH_4HF_2$) saturated solution was prepared. The MgO was sifted through a 200 mesh sieve screen on to the surface of the solution so that each particle was fully hydrated as it descended to the bottom of the containing vessel. The hydrated mixture was twice slurry-blended for six minutes and then left in contact with the $NH_4HF_2$ solution for eighteen hours. The liquid was decanted and the hydrated colloidal mixture dried. The dried mixture was placed in a platinum crucible and heated to 1315° C. This temperature was held for four hours, programmed cooled at 13° C./hr. to 1200° C., then cooled to room temperature. The MgO crystallites measure about 0.13 mm cubes. The X-ray purity is 100% and its lattice constant is a=4.213 Å. Many transparent refractory oxides have been produced by this type of UCDP processing.

A variety of furnaces and techniques can be used to UCDP manufacture refractory oxide compositions from solid, molten or vapor states. The furnace-pressure capabilities can range from negative pressures (vacuums) to pressures greater than one atmosphere. The compositions are contained in platinum, molybdenum, or ceramic crucibles or compacted into high density billets and reacted through the various Reaction decomposition-temperatures. If needed, a protective environment for the crucible is used.

Numerous physical forms which can be fabricated by various procedures include: 3-D macroscopic single crystals; slip casting a precursor complex in a mold and the molded complex article heated to its end product; applying coatings on substrates by sputtering, chemical vapor deposition or by a liquid-phase-epitaxy procedure. In this invention, refractory oxides in the physical form of coatings, thick or thin films, layers, thin plates, grains, fibers, or filaments are referred to as two-dimensionally (2-D) shaped articles of manufacture.

A number of the below refractory oxides compositions derived from the oxyfluoride formula compositions are known; however, the vast majority are new multi-cationic compositions. These compositions illustrate the compositional categories earlier stated.

OXIDE FORMULA COMPOSITIONS

Examples of novel multi-cationic refractory oxides which can be produced from precursor metal oxyfluorides as defined hereinabove and which, except for the absence of the $F_f$ components, compositionally otherwise correspond thereto, are cationically homogeneous, nanostructured and substantially pure refractory oxides having novel properties including novel multiple cations selected from the compositions consisting of:

1) $Al_{2-(x+y+w)}R_xJ_yQ_{0.75w}O_3$,
2) $Ba_{2-2p}Na_{1-(x-p)}K_xR_pNb_{5-y}Ta_yO_{15}$,
3) $Ba_{1-(2p+s+0.5x)}U_pR_pD_sA_xMg_{1-y}D_yAl_{10-(z+w)}J_zQ_{0.75w}O_{17}$,
4) $Ba_{1-x}D_xTi_{1-(y+0.75z)}J_zZr_yO_3$,
5) $KTa_{1-(x+0.6y)}Nb_xJ_yO_3$,
6) $LiSr_{1-(0.5g+x+z)}Al_{1-(y+w)}U_gD_zR_{0.67x}J_yQ_{0.75w}O_3$,
7) $Li_{1-(x+z+d)}D_{0.5x}D_{0.5d}J_{0.33z}Ta_{1-y}Nb_yO_3$,
8) $Mg_{1-x}D_xAl_{2-y}J_yO_4$,
9) $Mg_{1-(x+y+z)}D_zJ_{0.67y}R_{0.67x}O$,
10) $Pb_{2-z}D_zK_{1-x}Na_xNb_{5-y}Ta_yO_{15}$,
11) $Sr_{1-(x+2p+z)}D_xU_pR_pJ_{0.67z}Nb_{2-y}Ta_yO_6$,
12) $W_{1-(0.33z+0.5x+0.5y+0.67w+0.83d)}D_zR_xJ_yQ_wA_dO_3$,
13) $Y_{2-x}R_xJ_dO_3$,
14) $Y_{3-x}R_xAl_{5(y+w)}J_yQ_{0.75w}O_{12}$,
15) $Y_{3-x}R_xFe_{5-y}J_y - _{12}$,
16) $Zr_{1-(0.5z+0.75x+0.8y+1.3d+1.5c)}D_zR_xJ_yQ_wA_dX_cO_2$;

wherein "U", "D", "R", "J", "Q", "A" and "X" are as defined hereinabove.

The quantity of the reactant mixtures used in the examples below, ranged from three to seven grams. The decomposition-temperature of each below example was empirically derived by heating a four gram sample reactant mixture to various temperatures and holding each of those temperatures constant for at least three hours. Microscopic analyses were performed followed by some X-ray analyses.

In some of the examples, the true lattice constants were not determined but were listed as the JCPD X-ray lattice constants of its "parent" composition.

The examples below are given to exemplify the UCDP and the scope of the invention and, are not intended to be restrictive in the sense of the scope of the invention.

EXAMPLE I

General Formula

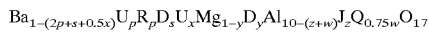

R=Y, lanthanides; $D_2$=Ca, Sr, Pb; U=K, Na; Q=Si, Ge; $D_y$=Co, Cu, Ge, Ni, Zn; J=Cr, Ga, Ti, Mn, V, Fe, Co;

$0 \leq p \leq 0.6$; $0.05 \leq s \leq 1$; $0 \leq w \leq 7.5$; $0 \leq x \leq 1.2$; $0 \leq y \leq 1$; $0 \leq z \leq 0.6$

Specific End Product Compound $Ba_{0.90}Na_{0.05}Nd_{0.05}MgAl_{9.914}Cr_{0.006}Ti_{0.08}O_{17}$(c) (New Composition)

The cationic reactant concentrations were: Al=82.6 at. %, Mg=8.3 at. %, Ba=7.5 at. %, Ti=0.7 at %, Na=0.4 at. %, Nd=0.4 at. %, Cr=1.0 at. %. The temperature of a three gram reactant mixture, consisting of $BaF_2+NaF+NdF_3+MgF_2+AlF_3+Al_2O_3+Ti_2O_3+H_2O$, in an alumina crucible, was raised to the isothermal decomposition-temperature of 1410° C. for five (5) hours to produce the refractory oxide. The furnace temperature was programmed cooled at 15° C. per hour to 1175° C. and then the furnace was cooled to room temperature. The X-ray purity is 99%. The crystal class is hexagonal where a=5.625 Å and c=22.62 Å. After materials characterization, the compound can be used for photonics or solid state electrolytic applications.

EXAMPLE II

General Formula $Ba_{2-2p}Na_{1-(x-p)}K_xR_pNb_{5-y}Ta_yO_{15}$

R=Y, Lanthanides $0 \leq p \leq 0.4$; $0 \leq x \leq 1$; $0 \leq y \leq 5$

Specific End Product Compound $Ba_{1.9}Na_{1.05}Nd_{0.05}Nb_{3.26}Ta_{1.74}O_{15}$(c) (New Composition)

The cationic reactant concentrations were: Ba=23.7 at. %, Na=13.1 at. %, Nd=0.6 at. %, Nb=40.8 at. % and Ta=21.8 at. %. The temperature of a three gram reactant mixture, consisting of $BaF_2+NaF+NdF_3+Nb_2O_5+Ta_2O_5+H_2O$, in an alumina crucible, was raised to the isothermal decomposition-temperature of 1250° C. for five (5) hours to produce the oxide. The furnace temperature was programmed at cooled 20° C. per hour to 1160° C. and then the furnace was cooled to room temperature. The crystal class is tetragonal. After materials characterization, single crystals of this compound can be used for dual-role nonlinear dielectric and self-frequency doubling laser applications.

EXAMPLE III

General Formula $Li_{1-(x+z+d)}D_{0.5x}D_{0.5d}J_{0.33z}Ta_{1-y}Nb_yO_3$ $D_x$=Ni, Co, Fe, Mg; $D_d$=Ni, Co, Cu, Zn; J=Cr, Fe;

$0 \leq d \leq 0.12$; $0 \leq x \leq 1$; $0 \leq y \leq 1$; $023 \; z \leq 0.4$

Specific End Product Compound $LiTa_{0.65}Nb_{0.35}O_3$(c)

The cationic reactant concentrations were: Li=50.0 at. %, Ta=32.5 at. % and Nb=17.5 at. %. The temperature of a three gram reactant mixture, consisting of $LiF+Nb_2O_5+Ta_2O_5+H_2O$ in an alumina crucible, was raised to the isothermal decomposition-temperature of 1160° C. for five (5) hours to produce the oxide. The furnace temperature was programmed cooled at 20° C. per hour to 1000° C. and then the furnace was cooled to room temperature. The crystal class is rhombohedral where a=5.1539 Å and c=13.81512 Å. After materials characterization, the compound can be used in electro-mechanical transduction applications.

EXAMPLE IV

General Formula $Pb_{2-z}D_zK_{1-x}Na_xNb_{5-y}Ta_yO_{15}$ $D_z$=Ba, Ca;

$0 \leq x \leq 1$; $0 \leq y \leq 5$; $0 \leq z \leq 2$

Specific End Product Compound $Pb_2KNb_5O_{15}$(c)

The cationic reactant concentrations were: Pb=25.0 at. %, K=12.5 at. %, Nb=62.5 at. %. The temperature of a three gram reactant mixture, consisting of $PbF_2+KF+Nb_2O_5+H_2O$, in an alumina crucible, was raised to the isothermal decomposition-temperature of 1120° C. for five (5) hours to produce the oxide. The furnace temperature was cooled at 10° C. per hour to 1070° C. and then the furnace was cooled to room temperature. The crystal class is orthorhombic with a=17.757 Å, b=18.011 Å, c=3.917 Å. This compound can be used in ferroelectric-ferroelastic fabrications and applications.

EXAMPLE V

General Formula $Y_{3-x}R_xAl_{5-(y+w)}J_yQ_{0.75w}O_{12}$

J=Cr, Ga, Ti, Fe, V, Co, Mn; Q=Si, Ge; R=Lanthanides $0 \leq x \leq 3$; $0 \leq y \leq 0.5$; $023 \; w \leq 5$;

Specific End Product Compound $Y_{2.71}Nd_{0.29}Al_{4.994}Cr_{0.006}O_{12}$(c)

The cationic reactant concentrations were: Y=33.87 at. %, Nd=3.63 at. %, Al=62.42 at. %, Cr=0.08 at. %. The temperature of a three gram reactant mixture, consisting of $YF_3+NdF_3+AlF_3+Al_2O_3+H_2O+Cr_2O_3$, in an alumina crucible, was raised to the isothermal decomposition-temperature of 1430° C. for six (6) hours to produce the oxide. The furnace temperature was programmed cooled at 15° C. per hour to 1150° C. and then the furnace was cooled to room temperature. The X-ray purity is 99%. The crystal class is cubic where a=12.009 Å. The product can be used as a doubly doped laser element. In the same way, the same product is produced from 2.71 $YF_3$+0.29 $NdF_3$+4.99 $AlF_3$+ 0.003 $Cr_2O_3$+12 $H_2O$.

EXAMPLE VI

General Formula $Y_{3-x}R_xFe_{5-y}J_yO_{12}$

J=Cr, Al, Ga, Co, Sc; R=Lanthanides

023 $x \leq 3$; $0 \leq y \leq 3$;

Specific End Product Compound $Y_3Fe_5O_{12}$(c)

The cationic reactant concentrations were: Y=37.5 at. %, Fe=62.5 at. %. The temperature of a three gram reactant mixture, consisting of $YF_3+Fe_2O_3+H_2O$, in platinum crucible, was raised to the isothermal decomposition-temperature of 1350° C. for ten (10) hours to produce the $Y_3Fe_5O_{12}$ garnet. The furnace temperature was programmed cooled at 15° C. per hour to 1100° C. and the furnace was cooled to room temperature. The crystal class is cubic where a=12.3788 Å. The X-ray purity, which is 96%, can be increased to 98% or higher by an adjustment of the reaction conditions. The product is useful in magnetic device fabrications and applications.

Using the preferred process aspect under the Summary of the Invention and beginning with Reaction IIA, a UCDP glass can be produced from a molten decomposition-temperature. The glass reactants (ingredients), which can be any refractory oxide glass composition, are reacted selectively with a minimum volume of an aqueous hydrogen fluoride solution, or its derivative. This is done to break cationic glass-forming-oxygen bridging bonds; which lowers the glass mixture's viscosity when the mixture becomes molten. The desired fluidity enables the same degree of cationically-homogeneity as found in other UCDP compositions. The UCDP molten glass decomposition-temperature is maintained until about 99% of the molten glass is free of fluoride anions. The molten glass composition is then cooled to a solid glass. During cooling, the about 1% residual fluoride anions enhance that the homogeneity of the molten glass composition and the solid glass are similar. The solid glass is then raised to a purification-temperature, in an air or oxygen environment, to remove the 1% residual fluoride anions.

Initial experiments appear to indicate that when a portion of the above thus-produced glass is powdered (−325 mesh) and subjected to Reactions IIA–VA of process option (1) under the Summary of the Invention and following the General Manufacturing Procedure, single crystalline and polycrystalline compositions are produced. Further studies of these features are on-going.

As earlier stated, the efficacy of a refractory oxide's properties is principally a function of its starting materials and the process used to produce it; hence, the applicant's below Novel (Inventive) Process Features:

NOVEL (INVENTIVE) PROCESS FEATURES

UCDP's generic and novel features include:

(a) All of the refractory oxides' compositional categories.
(b) Optical-grade transparent compositions.
(c) Cationically-homogeneous compositions.
(d) Nanostructured compositions.
(e) From 100° C. to 1537° C. reduced temperature range productions.
(f) Any number of cations uniformly distributed in a given composition.
(g) High temperature process monitoring.
(h) Multi-functional liquid water role and its ions ($O^=$, $OH^-$, and $H^+$) and liquid water's replacement by HF(aq).
(i) A precisely-reproducible process.
(j) Theoretical density compositions.
(k) High composition yields.
(l) Strain-free compositions.
(m) High structural quality refractory oxides.
(n) Unagglomerated powdered compositions.
(o) Isolation of solid state metal hydroxyfluoride and metal oxyfluoride complexes.
(p) Nanocomposite compositions.
(q) Many disadvantages of prior art refractory oxide materials preparation procedures markedly reduced or eliminated.
(r) Commercial single crystalline and polycrystalline productions.
(s) The manufacture of known and novel refractory oxide compositions produced from oxyfluoride solid, molten or vapor states, in two or three-dimensionally shaped physical forms.
(t) Crystalline compositions produced from glass compositions.
(u) Some refractory oxides which exhibit one or both of electrostatic and magnetic properties.

While the embodiments described herein are illustrative of the principles of this UCDP invention, various modifications and advantages may be achieved by those skilled in the art without departing from the scope and the spirit of the invention; as defined by the following claims.

What is claimed is:

1. A process for producing a refractory oxide which comprises (a) reacting liquid water with: (1) at least one metal fluoride reactant, or (2) at least one metal fluoride reactant and at least one metal oxide reactant, to produce either a slurry-blended dispersion which produces a fully-hydrated, cationically-homogeneous and nanostructured colloidal mixture or a solution; (b) removing the liquid from either the colloidal mixture or solution to form a dried product; (c) heating the dried product to produce a solid state metal hydroxyfluoride; (d) further heating the thus-produced metal hydroxyfluoride to a higher temperature at which it chemically decomposes, by heat alone, into a cationically-homogeneous nanostructured solid state metal oxyfluoride; and performing one of the following heating steps: (i) heating the thus-produced metal oxyfluoride to a solid state decomposition-temperature at which it chemically decomposes, by heat alone, into a cationically-homogeneous nanostructured solid state refractory oxide; or, (ii) heating the thus-produced metal oxyfluoride to a molten state decomposition-temperature at which it chemically decomposes, by heat alone, into a cationically-homogeneous nanostructured solid state refractory oxide; or, (iii) heating the thus-produced metal oxyfluoride to a vapor state decomposition-temperature at which it chemically decomposes, by heat alone, into a cationically-homogeneous nanostructured solid state refractory oxide.

2. The process of claim 1, wherein the reactant for step (a) comprises at least one metal fluoride.

3. The process of claim 1, wherein the reactants for step (a) comprise at least one metal fluoride and at least one metal oxide.

4. The process of claim 1, wherein the reactants, in at. wt. %, are: Ba=7.5, Na=0.4, Nd=0.4, Mg=8.3, Al=82.6, Cr=0.1 and Ti=0.7; weighed and dry mixed as $BaF_2$, $NaF$, $NdF_3$, $MgF_2$, $AlF_3$, $Al_2O_3$, $Cr_2O_3$, and $Ti_2O_3$; and the heating of the oxyfluoride is at 1410° C. to produce $Ba_{0.90}Na_{0.05}Nd_{0.05}MgAl_{9.914}Cr_{0.006}Ti_{0.08}O_{17}$.

5. The process of claim 1, wherein the reactants for step (a) are $AlF_3 \cdot 3H_2O$ and $Al_2O_3$ in a 3 to 1 mol ratio, respectively; and the heating of the oxyfluoride is at 1470° C. to produce transparent $Al_2O_3$.

6. The process of claim 1, wherein the reactant for step (a) is $YF_3$; and the heating of the oxyfluoride is at 1470° C. to produce transparent $Y_2O_3$.

7. The process of claim 1, wherein the reactants, in at. wt. %, for step (a) are: Y=33.87, Nd=3.63, Al=62.42 and Cr =0.08; weighed and dry mixed as $YF_3$, $NdF_3$, $AlF_3$, $Al_2O_3$ and $Cr_2O_3$; and the heating of the oxyfluoride is at 1430° C. to produce transparent $Y_{2.71}Nd_{0.29}Al_{4.994}Cr_{0.006}O_{12}$.

* * * * *